Patented May 24, 1932

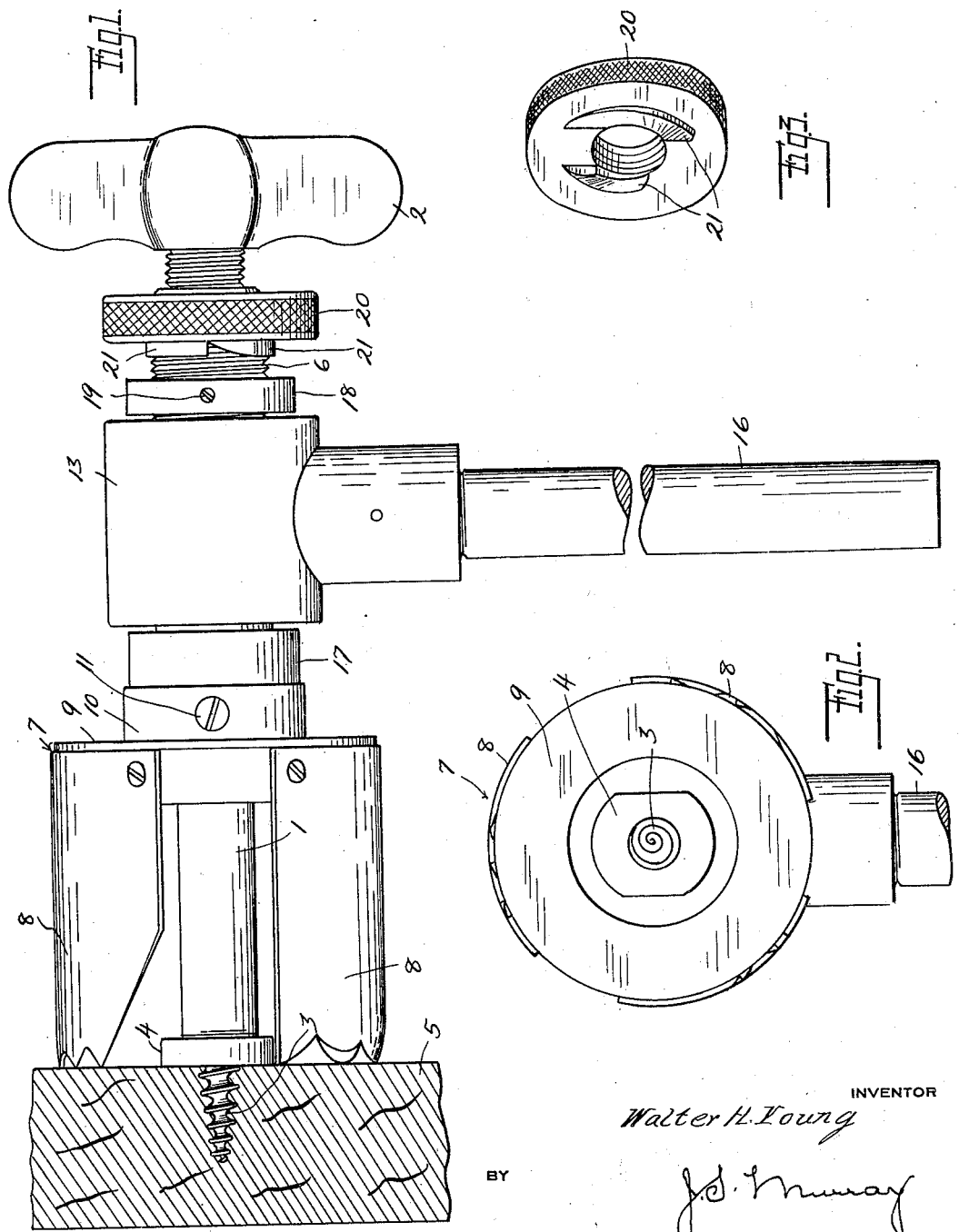

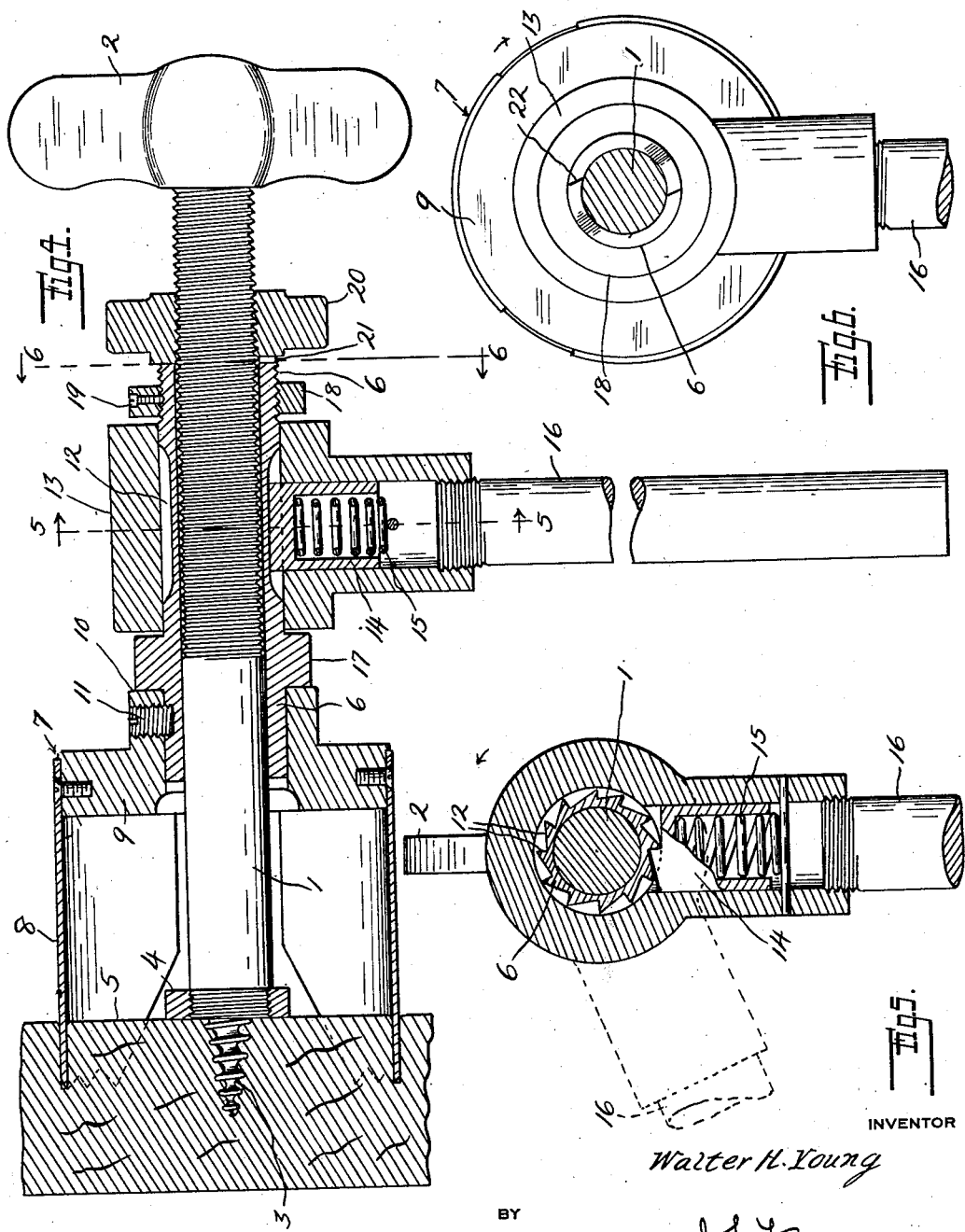

1,859,547

UNITED STATES PATENT OFFICE

WALTER H. YOUNG, OF DETROIT, MICHIGAN

PLUG CUTTING TOOL

Application filed May 4, 1931. Serial No. 534,766.

This invention relates to wood working tools, and particularly tools for cutting plugs from joists or other wooden members.

An object of the invention is to rotatively mount a plug cutter on a shaft which is quickly attachable to a member from which a plug is to be cut, and to utilize said shaft, when so attached, as a feed screw for advancing the cutter into said member through rotation of said tool.

Another object is to establish a freely sliding and freely rotative relation of the cutter to said shaft, and to engage with the threads of said shaft a nut adapted for clutch connection with the cutter to establish the desired feed.

A further object is to provide a convenient ratchet operating means for the cutter, permitting manual application of a considerable force to rotate and feed the cutter.

These and various other objects the invention attains by the construction hereinafter described, and illustrated in the accompanying drawings, wherein:

Fig. 1 is a view of the improved cutter in side elevation, disclosing its initial position in cutting an opening.

Fig. 2 is an end view of said tool.

Fig. 3 is a perspective view of a nut having clutch teeth.

Fig. 4 is an axial, sectional view of the improved tool, showing a plug partially cut.

Fig. 5 is a cross sectional view of the tool, taken on 5—5 of Fig. 4.

Fig. 6 is another cross sectional view on 6—6 of Fig. 4.

In these views the reference character 1 designates a shaft which at one end rigidly carries a handle 2, and which has a heavy tapered screw 3 projecting from its other extremity. At the base of said screw a small collar 4 is screw-threadedly or otherwise rigidly secured on said shaft, forming an abutment to engage the joist 5 or other member, into which the screw 3 has been driven.

Freely slidable and rotative on said shaft is a relatively short sleeve 6, which upon its forward end portion mounts fast a plug cutter 7. Said cutter may have any suitable construction and diameter, and as shown comprises a set of teeth 9 (preferably of sheet steel) outwardly spaced from the shaft 1 to jointly form a cylinder and correspondingly secured to a relatively heavy disk 9. Said disk comprises a hub portion 10, fixed on said sleeve by a set screw 11.

The sleeve 6 has an approximately central portion milled to form ratchet teeth 12 and rotatively mounting a collar 13. In the latter is radially slidable a detent 14, toothed to engage the ratchet teeth 12, and urged into such engagement by a coiled spring 15.

For rotative actuation of said collar, a lever arm 16 projects radially therefrom and is preferably detachably engaged with said collar by screw threads or the like. The collar 13 is held in place on the sleeve 6 by a pair of relatively small collars 17 and 18, the former being integral with said sleeve and forming also an end abutment for the cutter 7, and the latter being threaded on the sleeve and held in place by a set screw 19.

The shaft 1 is formed with screw threads extending preferably from the handle 2 a distance approximately equal to the maximum feed to be applied to the cutter, and a nut 20 is engaged with said threads between the handle 2 and sleeve 6. Said nut is integrally formed with radial clutch teeth 21, to engage clutch teeth 22 terminally formed on the sleeve 6. Such engagement may be established by either sliding the sleeve 6 toward the nut 20, or by screwing the latter against said sleeve. Said nut is milled or otherwise adapted for convenient manual actuation.

In the use of the described tool, the shaft 1 is initially rotated by the handle 2 to drive the taper screw 3 fully into the joist or other member 5 from which a plug is to be removed. This establishes said shaft in a substantially rigid and perpendicular relation to said joist. The unit formed by the sleeve 6 and cutter 8 is now slid upon said shaft to establish the initial cutting position of the cutter in contact with the joist, best shown in Fig. 1. The nut 20 is then turned on the threads of the shaft 1 to engage the clutch teeth of said nut with those of said sleeve. The lever 16 is now angularly oscillated to effect a step-by-step rotation of the sleeve 6 and cutter 7, through coaction of the dog 14 and ratchet teeth 12. Because of the clutch engagement between said sleeve and the nut 20, the latter participates in such step-by-step rotation, and consequently automatically feeds the cutter into the joist. Timing of said feed with respect to rotative advance of the cutter is determined by the pitch of the engaged threads of said shaft and nut. In thus advancing the cutter into the work, the nut 20 forms an abutment to which the cutter reaction is transmitted through the sleeve, thus assuring that clutch engagement between the nut and sleeve will be maintained.

When the joist has been cut through, the tool will be withdrawn, the cut-out plug still engaging the screw 3. By now retracting the nut 20 into proximity to the handle 2, and then sliding the sleeve 6 back against said nut, the cutter is withdrawn from its embracing relation to the removed plug, so that the latter may be readily grasped to disengage it from the screw 3.

The described plug cutter is relatively simple and inexpensive, and its adaptability to be secured to the joist to be cut, eliminates necessity for any clamping element to properly position the tool and resist the cutter reaction.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. In a tool of the character described, the combination with a shaft having a threaded portion, and means carried by one end of said shaft to mount the shaft on a piece of work, of means carried by the other end of said shaft for actuating the shaft to establish such mounting, a cutter freely slidable and freely rotatable on said shaft, a clutch element coaxial with the cutter and having a unitary connection therewith, a nut threaded on said shaft between said actuating means and the cutter, and moveable longitudinally of the shaft independently of the cutter, said nut having clutch teeth facing the cutter for coaction with said clutch element, and means for rotatively actuating said cutter.

2. In a tool of the character described, the combination with a shaft having a threaded portion, means carried by one end of said shaft for attaching the shaft to a piece of work, a sleeve rotative and freely slidable on the shaft, a cutter carried by said sleeve having cutting teeth outwardly spaced from said shaft, said sleeve having a ratchet toothed portion, a collar rotative on said sleeve, a dog carried by said collar engageable with said ratchet teeth to effect a step-by-step rotation of the sleeve responsive to angular oscillation of the collar, means carried by the collar for effecting its angular oscillation, and a member engaging the threads of said shaft, coating with said sleeve to effect an automatic feed of the cutting tool responsive to rotation of said sleeve.

In testimony whereof I sign this specification.

WALTER H. YOUNG.